United States Patent Office 3,424,837
Patented Jan. 28, 1969

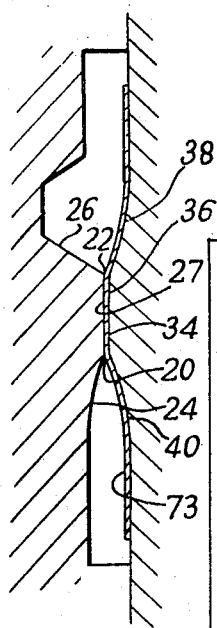
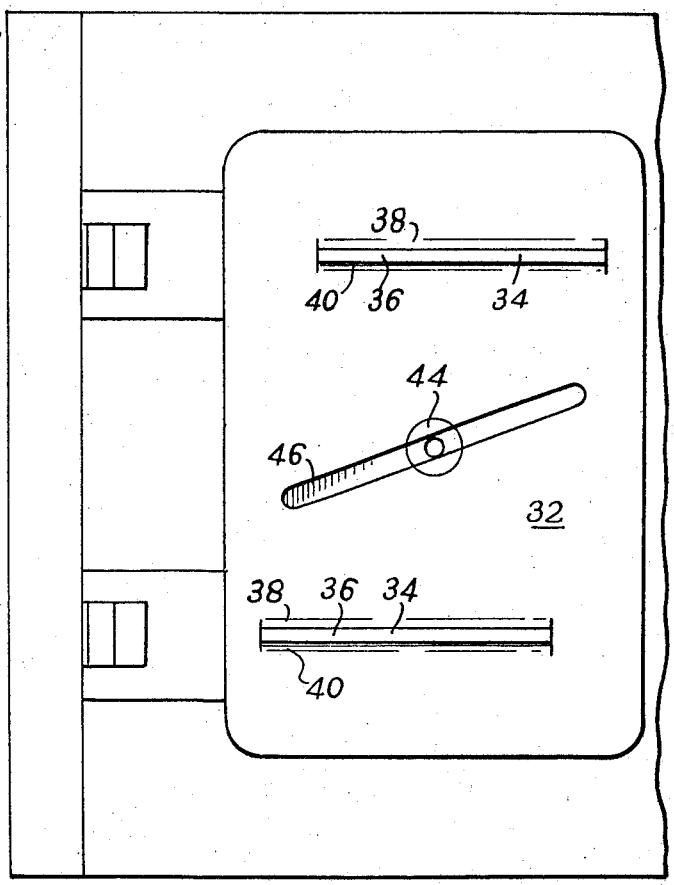

3,424,837
FORMING OF ARTICLES FROM PLASTIC MATERIAL BY INJECTION MOULDING
Edward Rankine Martin, Arkley, near Barnet, England, assignor to Fraser & Glass Limited, London, England, a British company
Filed Nov. 9, 1964, Ser. No. 409,762
Claims priority, application Great Britain, Nov. 11, 1963, 44,372/63
U.S. Cl. 264—252
Int. Cl. B29f 1/10
3 Claims

ABSTRACT OF THE DISCLOSURE

The present invention relates to a method of forming a plastic article which comprises positioning a solid sheet of plastic material of less than .008 inch thickness between opposed mold members, bringing the opposed mold members together, injecting into the mold cavity formed by said closed mold halves a flowable plastic material compatible with the plastic material in the aforesaid solid sheet of plastic material, maintaining limited sections of the opposing surfaces on said mold members sufficiently close to limited areas of said solid sheet of plastic material so that the flowable plastic injected into the mold cannot flow between said limited sections of the mold and the said limited areas of the interposed solid sheet of plastic material, allowing said interposed plastic sheet and said injected plastic to set to an integral mass, and removing said integral plastic article from the mold, a portion of said plastic article consisting of a planar sheet section less than .008 inch thick and the remainder of said plastic article having a thickness greater than .008 inch.

---

The method of the invention as set forth above is particularly apt for the production of articles in which the thickness of one portion of the article is smaller than can be achieved by injection moulding techniques.

The invention will now be described, by way of example, with reference to the accompanying drawings in which:

FIGURE 4 is a scrap sectional view on the line IV—IV of FIGURE 1; and

FIGURE 5 is an underplan view of a fixed part of the mould.

Figure 2:
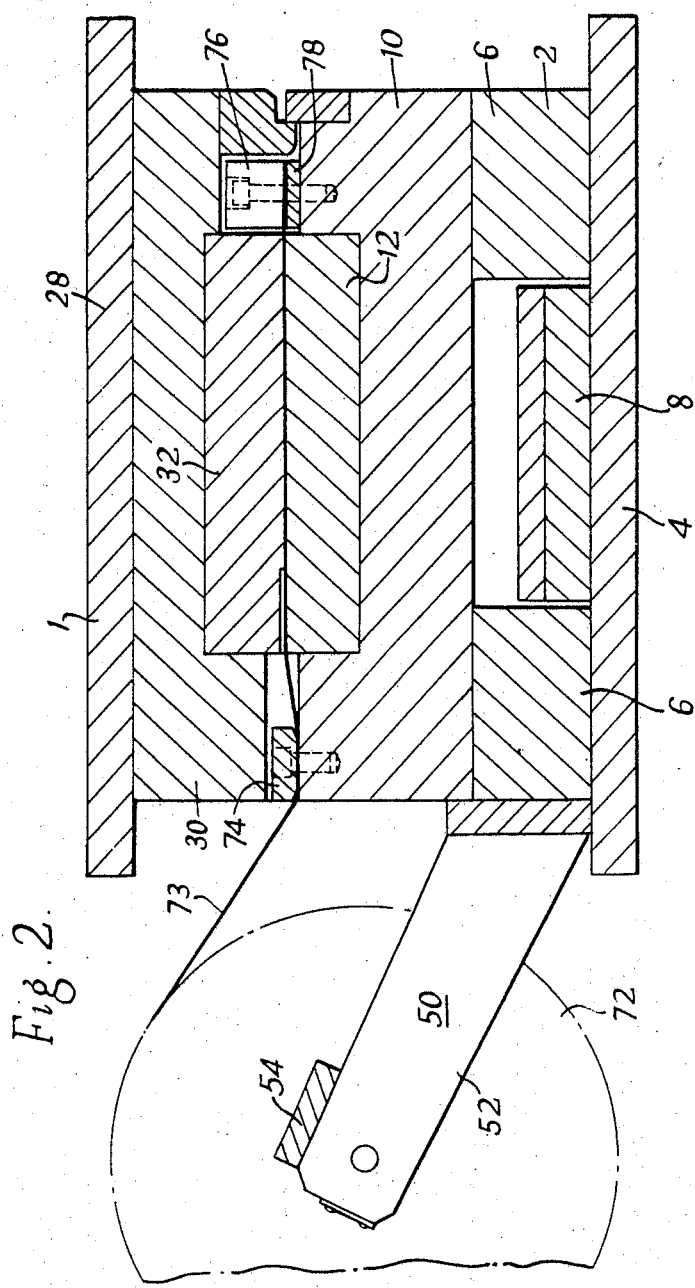
FIGURE 2 is a sectional side elevation on the line II—II of FIGURE 1.
Figure 3:
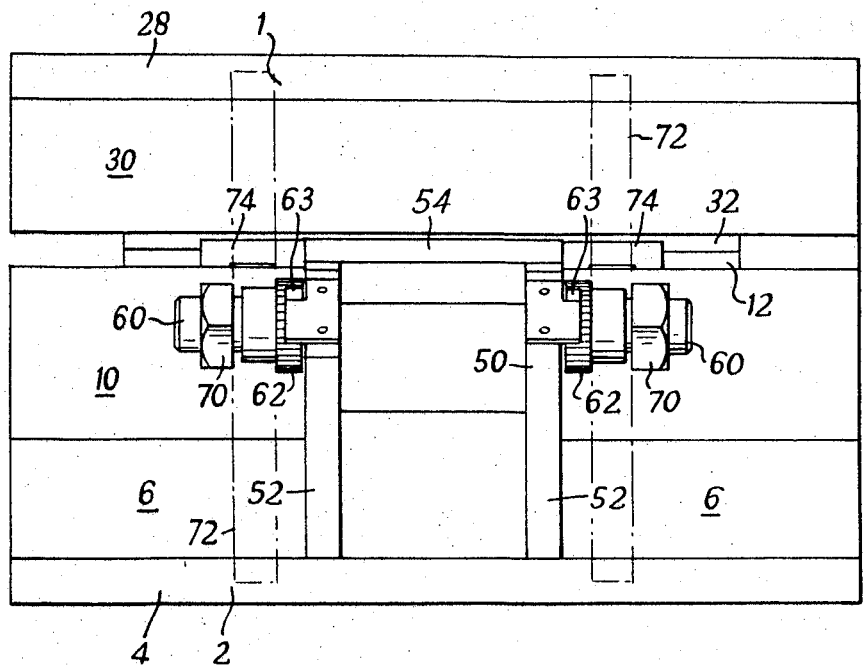
FIGURE 3 is a view as seen looking from the left of FIGURE 2.

Referring to the drawings, the mould of an injection moulding machine comprises a fixed mould part 1 and a movable mould part 2 as shown particularly in FIGURES 2 and 3. The particular mould illustrated is used for the manufacture of a hinged element used as a flap valve for operation under very light air pressure.

The movable mould part, as is well known, is carried on a crosshead which is reciprocable on guides on the machine frame by means of an hydraulic mould locking ram whilst the fixed mould part is mounted on a platen carried on the machine frame and on the side of which opposite the fixed mould part is disposed the known injection apparatus of the machine.

The movable part 2 consists of a base plate 4 on which are mounted pads 6 between which is disposed ejector mechanism generally indicated at 8 (see FIGURE 2). On the pads 6 is carried a block 10 in the face of which remote from the pads 6 is formed a rectangular recess which accommodates a mould plate 12. In the surface of the mould plate 12 which faces the fixed mould part 1 are formed pairs of recesses 14 and 16 shown in FIGURE 1 which define side walls of cavities to which, as hereinafter described, polypropylene is supplied to form second parts of a hinged element which are connected by and disposed along opposite edges of a first part of the element. The second parts of the element are of substantially greater thickness than the first part thereof. Along opposed edges 20, 22 of the recesses 14 and 16 are formed chamfered surfaces 24 and 26 which are connected by a surface 27 (see FIGURES 1 and 4).

The fixed mould part 1 as can be seen particularly in FIGURES 2 and 3 consists of a base plate 28 on which is carried a block 30 the face of which adjacent the movable mould part 2 is formed with a rectangular recess which accommodates a mould plate 32. The surface of the plate 32 is flat over most of its area but includes projecting strips 34 which each include a flat surface 36 and chamfered side surfaces 38 and 40 (see FIGURES 4 and 5). In the closed position of the mould the surfaces 36, 38 and 40 respectively overlie the surfaces 27, 26 and 24 of the mould plate 12. It should be noted that the level of the surface 27 is somewhat below the level of the main surface facing the mould plate 32 and that in the closed position of the mould (see FIGURE 4) the surfaces 27 and 36 are spaced apart only by a very small distance, less than .008 inch which is too small to permit flow therethrough of hot flowable polypropylene.

Figure 1:
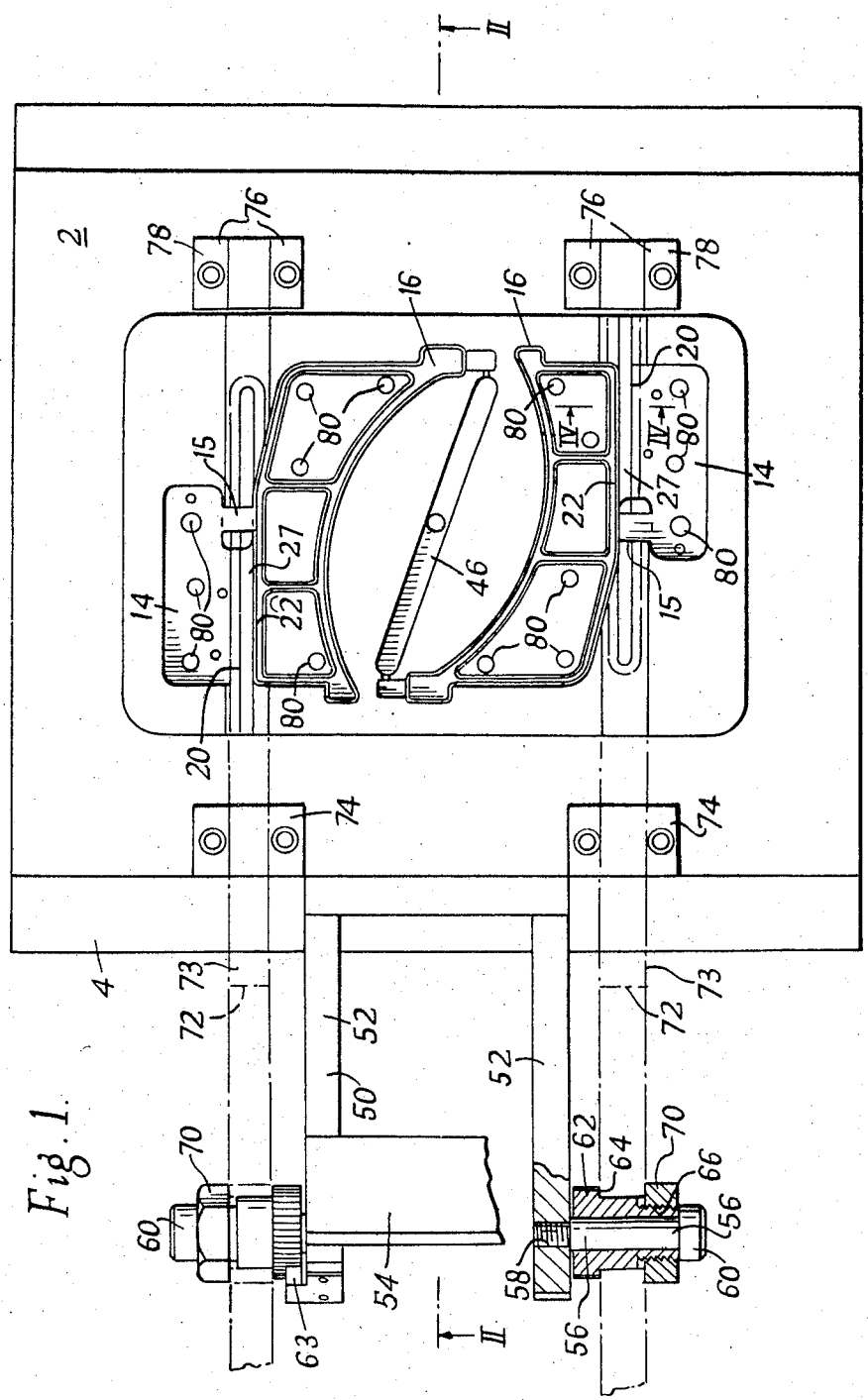
FIGURE 1 is a plan view of a movable part of the mould of an injection moulding machine and associated parts.

For supplying hot flowable polypropylene to the mould recesses 14 and 16 which in the closed position of the mould are formed into closed cavities by flat parts of the facing surface of the mould plate 32, there is provided a runner system consisting of a tapered hole 44 as shown in FIGURE 5, formed in and passing centrally through the fixed mould part 1. At its inner end the hole 44 is connected with a passage 46 formed partly in the mould part 1 and partly in the mould part 2 as shown in FIGURES 1 and 5, whilst at its outer end the hole 44 is supplied with flowable polypropylene from the known ram injection apparatus of the machine. The passage 46 at its ends connects with the recesses 16 shown in FIGURE 1 and for enabling flow of material from recesses 16 to recesses 14 there are formed between these recesses connecting recesses 15 which are closed by flat parts of the facing surface of the mould plate 32 in the closed position of the mould.

The first part of the hinged element formed by the illustrated apparatus consists of a strip of sheet polypropylene which is .003 inch thick. The polypropylene strip is placed on the surface 27 and after closure of the mould and injection of flowable polypropylene the strip of polypropylene securely units with the material in the adjoining mould cavities.

For introducing the strips of sheet polypropylene into the mould there is mounted on the movable part 2 of the mould a yoke 50 consisting of inclined side members 52 connected by a transverse member 54 as shown in FIGURES 1 to 3. The side members each carry a laterally outwardly projecting stub axle 56 secured by a screw thread 58 to the side member and having enlarged head 60 at its outer end. On the stub axle is a bush 62 formed with a shoulder 64 and an outer threaded part 66 which is engaged by a locking nut 70. Between the shoulder 64 and the nut 70 is carried a reel 72 of polypropylene strip material 73. From each reel 72 the strip material 73 is fed beneath a guide in the form of a bridge piece 74 on the face of the movable part 2 of the mould opposite the fixed part 1. From the bridge piece 74 the strip extends across the face of the mould part 2 and lengthwise along the surface 27 from which the strip passes between upstanding arms 76 of a further guide 78 of U-shaped form which is secured to the mould part 2 as shown in FIGURES 1 and 2. From each guide 78 the strip passes out of the mould. It will be seen that the strips are of such width that their side edges overlap the recesses 14 and 16. It will further be seen from FIGURES 1 and 3 that the exterior surface of the bushes 62 is knurled and engaged by a blade 63 mounted on the side member 52. This arrangement prevents overrunning of the reels 72 when the strips 73 are drawn through the mould between successive injections.

In operation, after first positioning the strips 73 the mould is closed and flowable polypropylene is supplied thorugh the runner system by known injection moulding technique. The recesses 14 and 16 are thus filled and the material therein closely and securely unites with the exposed portions of the associated strips 73. The mould is then opened and as the movable mould part 2 moves away from the fixed mould part 1, the ejector mechanism 8 which carries ejector pins 80 engages fixed rods so that upon further movement of the mould part 2 away from the mould part 1, the formed hinged elements are lifted by pins 80 out of their recesses. The strips 73 are then pulled to remove the hinged elements from the mould and thereby to bring fresh lengths of the strips 73 into operative position relative to the recesses 14 and 16. The sequence of operation can then be repeated.

The hinged elements removed from the mould on the strips 73 are subsequently trimmed so as to remove the portions 15 connecting the parts of each element on opposite sides of the strips 73 and also to remove the parts of the strips 73 other than the parts thereof connecting the parts of the elements on opposite sides of the strips 73.

The invention has been described in relation to a hinged element having a first part which is of a thickness less than .008 inch, it being known that the thinnest section that can be injection moulded is of this order of thickness. It is known that polypropylene can be used for making a hinge by first injection moulding an article having a section of from .012 to .020 inch thick and then drawing this thin section from opposite sides thereof. This technique of forming polypropylene hinges has, for many reasons, a high rejection rate and, therefore, the method described in accordance with the present invention is much to be preferred.

It will be appreciated that whilst polypropylene is a preferred material, other suitable forms of thermoplastic material may be employed.

I claim:
1. The method of forming a plastic article which comprises:
    (a) positioning a solid sheet of plastic material of less than .008 inch thickness between opposed mold members,
    (b) bringing the opposed mold members together,
    (c) injecting into the mold cavity formed by said closed mold halves a flowable plastic material compatible with the plastic material in the aforesaid solid sheet of plastic material,
    (d) maintaining limited sections of the opposing surfaces on said mold members sufficiently close to limited areas of said solid sheet of plastic material so that the flowable plastic injected into the mold cannot flow between said limited sections of the mold and the said limited areas of the interposed solid sheet of plastic material,
    (e) allowing said interposed plastic sheet and said injected plastic to set to an integral mass, and
    (f) removing said integral plastic article from the mold, a portion of said plastic article consisting of a planar sheet section less than .008 inch thick and the remainder of said plastic article having a thickness greater than .008 inch.

2. The method of claim 1, wherein the solid sheet of plastic material is in continuous strip form and is fed between the oppposed mold members between successive injections of flowable plastic material.

3. A method according to claim 2, wherein the injected plastic material fuses with opposite edge portions of said continuous strip so as to result in a plastic article having edge portions that are thicker than .008 inch and an intermediate portion having a thickness less than .008 inch.

References Cited

UNITED STATES PATENTS

| | | | |
|---|---|---|---|
| 2,273,994 | 2/1942 | Rochester | 264—252 |
| 2,713,369 | 7/1955 | Strahm. | |
| 3,166,795 | 1/1965 | Joffe | 264—275 |
| 3,178,772 | 4/1965 | Morin | 264—252 |
| 2,920,354 | 1/1960 | Zumbrunnen | 264—251 |
| 2,965,932 | 12/1960 | Knowles | 264—251 |

ROBERT F. WHITE, *Primary Examiner.*

T. J. CARVIS, *Assistant Examiner.*

U.S. Cl. X.R.

264—275, 276, 328